United States Patent Office 3,690,948
Patented Sept. 12, 1972

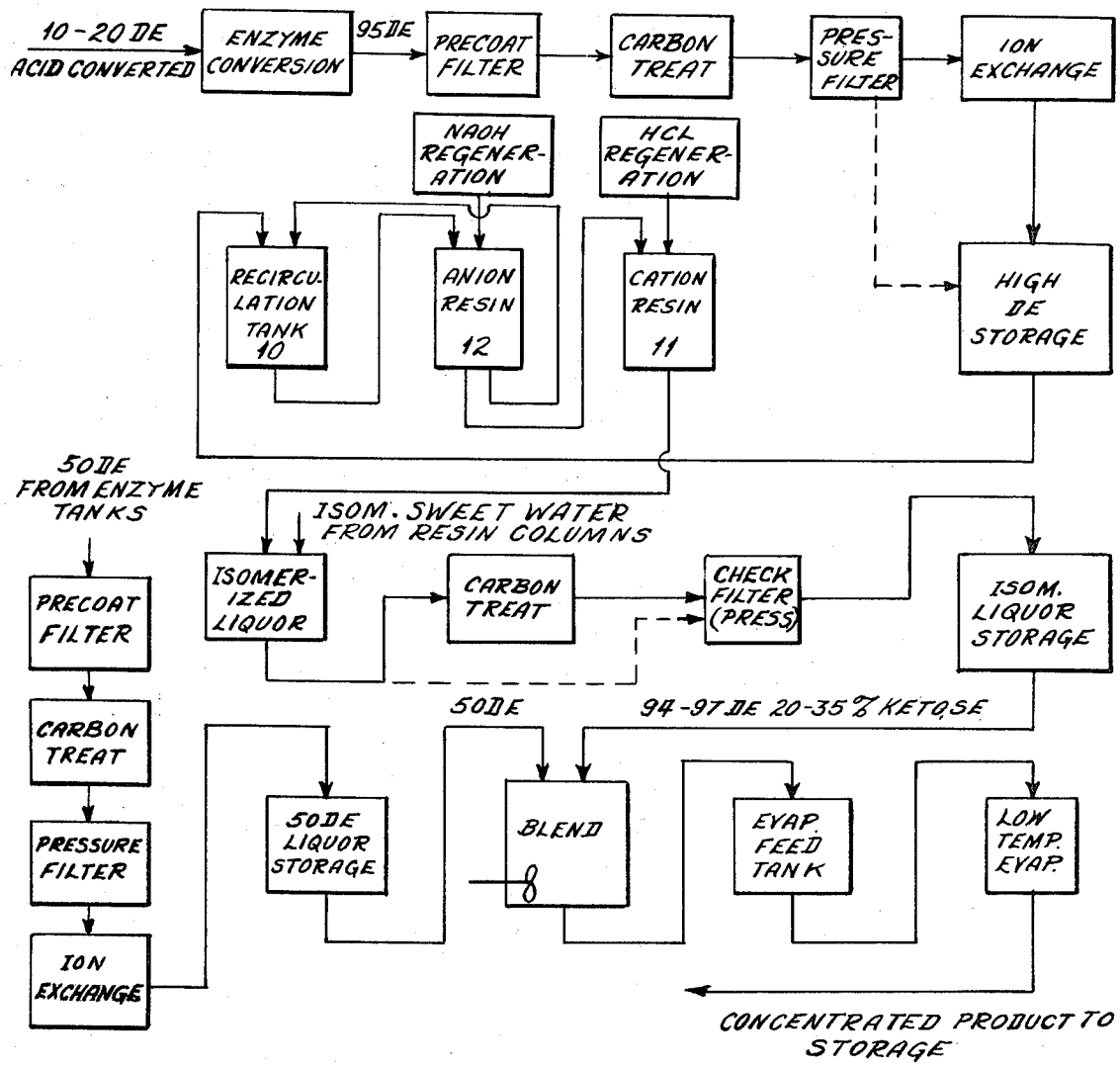

3,690,948
PROCESS OF MAKING HIGH D.E. FRUCTOSE
CONTAINING SYRUPS
Edward Katz, St. Louis, Irving Ehrenthal, University City, and Barrett L. Scallet, Clayton, Mo., assignors to Anheuser-Busch, Incorporated, St. Louis, Mo.
Filed Aug. 31, 1970, Ser. No. 68,125
Int. Cl. C13k 9/00
U.S. Cl. 127—46 A
12 Claims

ABSTRACT OF THE DISCLOSURE

A line of fructose-containing, water white, ash-free, high D.E. syrups is made by resin isomerization utilizing a macroreticular resin in the OH⁻ form. The high dextrose (95%) feed is recirculated through a strong base anion macroreticular resin column and then passed through a strong acid cation column.

BACKGROUND OF THE INVENTION

There are several methods of isomerizing syrups to convert a portion of the dextrose to fructose. These include those described in Cantor 2,354,664, Scallet et al. 3,285,776 and 3,305,395, Langlois 2,746,889 and Tsao 3,432,395. These processes all require difficult purification steps for removal of impurities such as color, ash, and odor. Processes are known which are designed to alleviate some of these problems. These include the patent to Scallet et al. 3,383,245.

Copending application Ser. No. 29,838, filed Apr. 20, 1970 also describes a loop isomerization process and contains subject matter in common with this application.

INTRODUCTION TO THE INVENTION

This invention relates to a process for producing a line of fructose-containing, water white, ash-free, high D.E. syrups.

The formation of fructose by a strong base anion resin technique is normally accompanied by some degradation products, some color bodies and traces of off-odors and off-flavors resulting from the isomerization resin. Removal of these impurities has been difficult and the resin has been subject to loss of efficiency resulting in an expensive product. This invention produces a high purity, low ash, colorless fructose-containing syrup by means of a macroreticular resin for isomerization which gives long life and continued efficient operation after many passes through the columns.

The method used to produce the foregoing product is as follows:

Starch is hydrolyzed by conventional means and then enzyme-converted to produce preferably a 95+ D.E. liquor high in dextrose. Other types of high dextrose feed may be used if desired. The terms dextrose and glucose are used interchangeably in this specification. The liquor is then purified by conventional methods and preferably, but not necessarily, ion exchanged to yield a water white, low ash 95+ D.E. liquor. This liquor is the raw material for the isomerization step.

A column containing a strong base anion macroreticular resin in the OH⁻ form is used for the isomerization. High D.E. ion exchanged feed liquor in the 20–60% DSB range is charged into a retaining vessel at a volume range of 2–12 volumes 40% DSB liquor per bed volume of strong base anion resin.

The reaction temperature of the system should be between ambient and 150° F. Presently available strong base resins are not stable above this temperature in the hydroxyl form as used in this process. The isomerization is conducted in an arrangement in which the feed liquor is recirculated through the anion resin at 0.01–30 bed volumes anion resin basis/min. until the proper fructose level is achieved.

Another resin column which contains a strong acid cation resin is set up to contain 1 bed volume resin per 1–50 bed volumes 40% DSB isomerized feed liquor. The isomerized syrup is passed through this cation column to remove objectionable color and odor.

At the end of the isomerization a typical analysis range would be 94–97 D.E. and 20–35% ketose. Exact specifications are determined by specific isomerization conditions. Lower DE feeds produce final syrups of lesser ketose percent.

The isomerized product made from a 95+ D.E. liquor can now be finished as is or blended with another syrup, for example a 50 D.E. high maltose liquor (preferably ion exchanged) to yield a blend containing 10–17% fructose, 68–80 D.E. and 37–45% dextrose.

The subject blend liquor then may be carbon treated, filtered and concentrated to produce a water white supersweet non-crystallizing fructose containing syrup.

SUMMARY OF THE INVENTION

This invention relates to a method of making high purity, low ash, fructose containing syrups by a continuous isomerization in a macroreticular type resin column and final purification in a cation column and to the products produced by said process.

DESCRIPTION OF THE DRAWINGS

The figure is a flow diagram of an overall process for producing a syrup according to this invention.

DETAILED DESCRIPTION

The figure shows a schematic flow diagram of the invention.

Initially starch is acid hydrolyzed to about 10–20 D.E. (Dextrose Equivalent) by conventional means and then is enzyme converted (by conventiontal procedures) to produce a 95+ D.E. liquor, preferably 98+ D.E. with 95%+ dextrose. The specific process illustrated uses a 98 D.E. liquor. The liquor is then purified by conventional methods and ion exchanged to yield a water white, low ash 98 D.E. liquor. This liquor is the raw material for the isomerization step.

The specific purification is a precoat filter for removal of muds, followed by a carbon treatment for color removal. The syrup then is pressure filtered for removal of carbon and all solids followed by an ion exchange treatment to remove ash. The ion exchange consists of a strong acid cation resin (C–25, IR200, or Dowex 50) and weak base anion resin (A–6). Thus the feed to the column isomerization is water white, of low ash (less than 0.05%)

and high D.E. and dextrose. The specific preferred feed is 98+ D.E. and 95%+ dextrose.

The feed goes to a recirculation tank 10 where it is pumped through the resin isomerization column 12 in a continuous recirculating path.

The resin column 12 contains a strong base anion macroreticular resin (styrene divinyl benzene containing quaternary ammonium groups) in the OH⁻ form, such as Rohm & Haas IRA 900. A macroreticular resin is essential because of its porosity and superior cycle life properties. The feed liquor has about 20-60% DSB and preferably 40% DSB. The feed volume is 2-12 bed volumes 40% DSB liquor per volume of strong base anion resin in the column 12. A range of 4-8 bed volumes is preferred.

The macroreticular resins preferred in the practice of this invention are described in British Pats. Nos. 932,125 and 932,126. The macroreticular resins have pores or passages through which the syrup can pass to get at the exchange sites on the interior of each bead of resin. The surface area of the macroreticular resins can vary between 20 and 70 or even higher square meters/gm. of dry resin. The porosity is from 0.4 to 0.6 or greater ml./ml. of resin. The average pore diameter is 600 to 1400 or more angstroms.

Each batch of feed is recirculated through the column 12 until the desired degree of isomerization is obtained. This may involve repeated passes through the tank 10 and the column 12 and may take 4 to 24 hours in the preferred embodiment.

After isomerization, the syrup is passed through a cation resin column 11 which contains a strong acid cation resin, such as, Duolite C-3 H⁺ form (methylene sulfonic functional group in phenolic matrix). Other suitable resins include Duolite C-25, etc. The column 11 contains 1 bed volume resin per 1-50 bed volumes 40% DSB (Dry Solids Basis) isomerized feed liquor and preferably contains 1 bed volume resin for each 10-20 bed volumes of feed.

After completion of each batch, the columns 11 and 12 are regenerated as hereinafter described before another batch of syrup is isomerized.

The reaction temperature of the system should be between ambient and 150° F. with a preferred temperature range of 110°-140° F.

At the end of the isomerization a typical analysis range would be 94-97 D.E. and 20-35% ketoses. These ketoses consist predominantly of fructose, but include small amounts of psicose, as was shown in U.S. Pat. No. 3,383,245.

The rate of circulation of the feed liquor through the system is about 0.01 to about 30 bed volumes anion resin basis/min. The preferred rate is about 0.05 to about 1.0 bed volumes/min. The amount of fructose obtained depends on a number of factors, such as resin contact time, temperature, solids level, type of resin, method of resin regeneration, etc.

The anion resin is regenerated by using a strong base reagent such as NaOH solution. The acid resin is regenerated by using a strong acid such as sulfuric or hydrochloric. The regeneration is done after every batch has completed its passes through the column.

As each batch is removed from the isomerization column, the columns 11 and 12 are regenerated. The column 12 may be given a pre-wash with approximately 1 to 2 N acid to strip color bodies and degradation products from hydroxyl sites in the resin. The spent acid from the regenerated cation resin may be used as a part of the pre-wash acid used to regenerate the anion column 12. After the initial acid treatment the anion column is rinsed and given its base treatment to regenerate the isomerizing hydroxyl sites in the resin to prepare the resin for the next batch of syrup.

The product from the isomerization has about 94-97 D.E. and 20-35% ketose. The small loss in D.E. during isomerization is more than compensated for by the increased sweetness of the fructose produced. This product may be carbon treated and pressure filtered before blending.

In a preferred process, the isomerized product made from the 95+ D.E. feed liquor is blended with a 50 D.E. high maltose liquor (preferably ion exchanged) to yield a blend containing 10-17% fructose, 68-80 D.E. and 37-45% dextrose.

The liquor to be blended is precoat filtered, carbon treated if necessary, pressure filtered and ion exchanged before blending. The blended liquor is concentrated to produce a water white, supersweet, non-crystallizing, fructose-containing syrup.

The reason that the isomerized product is blended is to reduce the dextrose content to below about 45%. Higher amounts of dextrose tend to crystallize upon standing, particularly in cool climates.

The isomerization can be employed with any glucose-containing liquor feeds to produce a fructose-containing syrup, but naturally the higher the glucose content the higher will be the ketose content in the finished syrup.

EXAMPLES

In each of the following examples there was produced a satisfactory water white, colorless, high fructose syrup.

EXAMPLE I

A 1½" ID jacketed glass column was charged with 100 cc. IRA-900 OH⁻ form macroreticular strong base anion resin. A glass aspirator bottle immersed in a 140° F. water bath is connected by hose to the suction of a submerged pump, the discharge of which is connected to the top of the jacketed resin column. The column bottom discharge runs into the top of the aspirator bottle to provide a recirculating system.

400 cc. of ion exchanged 95 D.E. 43.0% DSB feed liquor is introduced into the aspirator bottle. A pump is used to recirculate 140° F. water through the jacket of the resin column. The feed liquor pump is started up when the feed liquor is at 140° F. Liquor is recirculated through the system at 1000 cc./min. at 140° F. No nitrogen or inert gas is required for purging the system.

Conversion is as follows:

| Time (hrs.): | Percent ketose |
|---|---|
| 0 | 0 |
| 3 | 22.6 |
| 6 | 27.3 |
| 9 | 27.4 |
| 12 | 28.5 |
| 24 | 29.2 |

EXAMPLE II

Temp. ° F.—110
Liquor—400 cc. ion exchanged 95 D.E., 45.2 DS.
Resin—100 cc. IRA 900 OH⁻.

| Time (hrs.): | Percent ketose |
|---|---|
| 1 | --- |
| 2 | --- |
| 3 | --- |
| 4 | --- |
| 5 | --- |
| 6 | --- |
| 7 | --- |
| 8 | --- |
| 9 | --- |
| 10 | --- |
| 12 | --- |
| 24 | 28.9 |
| 48 | 34.4 |
| 54 | 34.6 |

EXAMPLE III

Temp. 125° F. resin column—100 cc. IRA-900 (OH⁻ form)
Flow rate—10 bed vol./min.
Feed—600 cc. ion exchanged 76 D.E. liquor, 60% dextrose, 40% DSB

| Time (hrs.) | Percent ketose | Percent fructose | Percent psicose | D.E. | Percent dextrose |
|---|---|---|---|---|---|
| 1 | 7.3 | | | | |
| 2 | 11.7 | | | | |
| 4 | 14.9 | | | | |
| 6 | 16.1 | | | | |
| 8 | 17.5 | | | | |
| 12 | 17.4 | | | | |
| 24 | 18.2 | 13.9 | 1.8 | 75.4 | 47.0 |

EXAMPLE IV

Temp.—125° F.
Liquor—384 cc. ion exchanged 95.0 D.E., 58.3% DS
Resin—100 cc. IRA-900 OH⁻ form

| Time (hrs.): | Percent ketose |
|---|---|
| 1 | 6.9 |
| 2 | 11.3 |
| 4 | 17.1 |
| 6 | 21.4 |
| 8 | 23.7 |
| 12 | 27.0 |
| 24 | 28.1 |

EXAMPLE V

Temp. ° F.—110
Liquor—400 cc. ion exchanged 81 D.E., 43.7 DS
Resin—100 cc. IRA 900 OH⁻

| Time (hrs.): | Percent ketose |
|---|---|
| 1 | 2.5 |
| 2 | 4.3 |
| 3 | --- |
| 4 | --- |
| 6 | --- |
| 7 | --- |
| 8 | 12.5 |
| 24 | 18.9 |

EXAMPLE VI

Temp. ° F.—140
Liquor—400 cc. ion exchanged 81 D.E., 44.7 D.S.
Resin—100 cc. IRA 900 OH⁻

| Time (hrs.): | Percent ketose |
|---|---|
| 1 | 20.3 |
| 2 | 24.6 |
| 3 | 26.8 |
| 4 | 28.9 |
| 6 | 28.0 |
| 7 | --- |
| 8 | --- |
| 24 | --- |

EXAMPLE VII

Temp. ° F.—125
Liquor—800 cc. ion exchanged 95+ D.E., 45.5 DS
Resin—100 cc. IRA 900 OH²

| Time (hrs.) | Percent ketose | D.E. | Percent dextrose | Fructose | psicose |
|---|---|---|---|---|---|
| 1 | 7.0 | 98.0 | 98.0 | | |
| 2 | 12.8 | | | | |
| 4 | 18.7 | | | | |
| 6 | 22.2 | | | | |
| 8 | 23.3 | | | | |
| 12 | 26.4 | | | | |
| 24 | 26.9 | | | | |
| 32 | 26.9 | | | | |
| 48 | 26.9 | | | | |
| 56 | 26.9 | 94.8 | 65.0 | 19.6 | 2.0 |

We claim:

1. A method of producing a substantially water clear low ash extra sweet syrup comprising the steps of:
    (a) feeding a syrup having a substantial proportion of dextrose into a resin isomerization column, said column comprising a strong base anion resin of the macroreticular type in the OH⁻ form,
    (b) circulating said syrup through the strong base resin column until a predetermined amount of the dextrose has been converted to ketoses,
    (c) passing said converted syrup through a strong acid column, and
    (d) recovering a purified syrup having increased ketose and reduced dextrose content.

2. The method of claim 1 wherein the feed is of D.E. greater than 95 and the dextrose content is greater than 90.

3. The method of claim 1 wherein the temperature of the syrup during the isomerization is between about ambient and about 150° F.

4. The process of claim 1 wherein the syrup is recirculated through the isomerization column for between 4 and 24 hours.

5. The process of claim 1 wherein the feed to the isomerization column is 2 to 12 volumes per volume of strong base resin.

6. The process of claim 1 wherein the acid resin is of the sulfonic acid type.

7. The process of claim 1 wherein the isomerized syrup contains 20–35% ketoses of which at least 15% are fructose.

8. The process of claim 1 wherein the input syrup is ion exchanged prior to entering the isomerization column.

9. The process of claim 1 wherein the isomerized syrup is blended with lower dextrose syrup to produce a high D.E., substantially water clear, non-crystallizing product having a dextrose content of below about 45%.

10. The process of claim 1 including the step of regenerating the isomerization resin by treating said resin with a strong acid prior to treating it with a strong base.

11. The process of claim 1 wherein the feed is of D.E. greater than 70 and the dextrose content is greater than 50%.

12. The process of claim 1 wherein the isomerized syrup is finished and concentrated to about 70% DSB.

References Cited

UNITED STATES PATENTS

| | | | |
|---|---|---|---|
| 2,746,889 | 5/1956 | Langlois | 127—46 A |
| 3,305,395 | 2/1967 | Scallet | 127—46 R |
| 3,475,216 | 10/1969 | Walon | 127—46 R |
| 2,911,329 | 11/1959 | Blann | 127—46 X |
| 2,892,737 | 6/1959 | Rohwer | 127—46 X |
| 3,285,776 | 11/1966 | Scallet | 127—46 R |
| 3,383,245 | 5/1968 | Scallet | 127—46 X |
| 3,558,355 | 1/1971 | Okazaki | 127—46 A |

MORRIS O. WOLK, Primary Examiner

S. MARANTZ, Assistant Examiner

U.S. Cl. X.R.

260—209